United States Patent [19]
Selle

[11] Patent Number: 6,164,882
[45] Date of Patent: Dec. 26, 2000

[54] SNOWMOBILE TIE-DOWN MECHANISM FOR A TRAILER

[75] Inventor: James E. Selle, Butte, Nebr.

[73] Assignee: Jirosel Corp., Bonesteel, S. Dak.

[21] Appl. No.: 09/458,775

[22] Filed: Dec. 10, 1999

[51] Int. Cl.$^7$ ..................................................... B60P 7/08
[52] U.S. Cl. ........................... 410/3; 410/2; 410/7; 410/8
[58] Field of Search .................................. 410/2, 3, 4, 7, 410/8, 9, 19, 77; 248/500, 503

[56] References Cited

U.S. PATENT DOCUMENTS

| | | | |
|---|---|---|---|
| 5,203,655 | 4/1993 | Persau | 410/3 |
| 5,607,270 | 3/1997 | Zimmerman | 410/3 |
| 5,716,175 | 2/1998 | Fenske et al. | 410/3 |
| 5,785,471 | 7/1998 | Godbersen | 410/3 |
| 5,816,757 | 10/1998 | Huston | 410/3 |
| 5,902,081 | 5/1999 | Zizzi | 410/3 |

*Primary Examiner*—Stephen T. Gordon
*Attorney, Agent, or Firm*—Zarley, McKee, Thomte, Voorhees & Sease; Dennis L. Thomte

[57] ABSTRACT

A tie-down mechanism for securing a snowmobile to a trailer wherein the trailer has an elongated track member embedded in the upper surface thereof which defines an elongated opening in the upper end thereof. The tie-down mechanism comprises a bolt having a head portion which is received in the channel of the track member so that the threaded shank thereof extends upwardly therefrom. An elongated ski bar is mounted on the bolt above the track member and has end portions which are adapted to be positioned over the skis of the snowmobile. An actuating lever is threadably mounted on the bolt above the ski bar and is pivotally movable between locked and released positions. When the lever is in its locked position, the ski bar is drawn into engagement with the skis of the snowmobile to maintain the snowmobile in place on the trailer.

13 Claims, 4 Drawing Sheets

SNOWMOBILE TIE-DOWN MECHANISM FOR A TRAILER

BACKGROUND OF THE INVENTION

1. Field of the Invention

The present invention relates to a tie-down mechanism for holding a snowmobile or snowmobiles in position on a trailer.

2. Description of the Related Art

In order to transport a snowmobile or snowmobiles on a trailer, it is conventional to use a ski bar or crossbeam that extends across both skis of the snowmobile. The ski bar is provided with a vertically disposed hole in the center thereof. A threaded bolt (crank) extends downwardly through the hole in the ski bar and screws into a nut which is secured to the deck of the trailer. As the bolt is threadably cranked tight, the ski bar holds the skis tight against the deck of the trailer, preventing the snowmobile from shifting or moving during transportation. This prior art method is time-consuming. Further, the threads on the bolt may become jammed or frozen, and therefore inoperative.

SUMMARY OF THE INVENTION

A tie-down mechanism for securing a pair of snowmobiles to a trailer is described although the mechanism may be used for securing a single snowmobile or more than two snowmobiles to the trailer. The trailer includes a bed portion having a forward end, a rearward end, and opposite sides. A pair of elongated track members are secured to the bed portion of the trailer and are preferably embedded therein between the sides thereof and extend parallel to the sides of the bed portion. The number of track members on the trailer will depend upon the number of snowmobiles to be transported. In the preferred embodiment, one snowmobile is positioned on each side of each track member. An elongated crossbar or ski bar, having opposite ends, is positioned above the track member and extends transversely with respect thereto so that the ends of the crossbar may be positioned on opposite sides of the track member above the skis of the snowmobiles. An elongated bolt having a head portion and a threaded shank portion extending upwardly therefrom is positioned with respect to the track member so that the head portion is selectively removably longitudinally received by the track member. A threaded nut or nut block is mounted on the threaded shank of the bolt above the crossbar and has a lever pivotally secured thereto, about a horizontal axis, which is movable between a horizontally disposed locked position and a vertically disposed release position. The lever includes a cam portion which engages the crossbar as the lever is moved from its release position to its locked position to draw the head portion of the bolt upwardly into engagement with the track member and for moving the crossbar downwardly into frictional engagement with the skis of the snowmobile. The tie-down mechanism includes a locking pin which maintains the lever in its locked position. Further, the lever has a protrusion means extending downwardly therefrom which is positioned adjacent the front side of the crossbar, when in its locked position, to prevent the lever from rotating with respect to the threaded bolt.

It is a principal object of the invention to provide a convenient tie-down mechanism for maintaining a snowmobile or snowmobiles on a trailer.

A further object of the invention is to provide a faster, more efficient system for securing snowmobiles to a trailer with the system being simple and inexpensive to manufacture.

It is a further object of the invention to provide a device of the type described above which provides a greater retaining force on the load to be transferred by the trailer.

Yet another object of the invention is to provide a tie-down mechanism of the type described including means for preventing the head of the tie-down bolt from rotating with respect to the track member.

Still another object of the invention is to provide a tie-down mechanism of the type described which provides an adjustment for different height skis.

Still another object of the invention is to provide a tie-down mechanism of the type described further including a locking nut which tightens against the top of the threaded head or nut block of the device to maintain the device in adjustment for the particular pair of skis for which it has been adjusted.

Still another object of the invention is to provide a quick latch system incorporated into a tie-down mechanism for maintaining a snowmobile or snowmobiles on a trailer.

These and other objects will be apparent to those skilled in the art.

DESCRIPTION OF THE PREFERRED EMBODIMENTS

Figure 1:
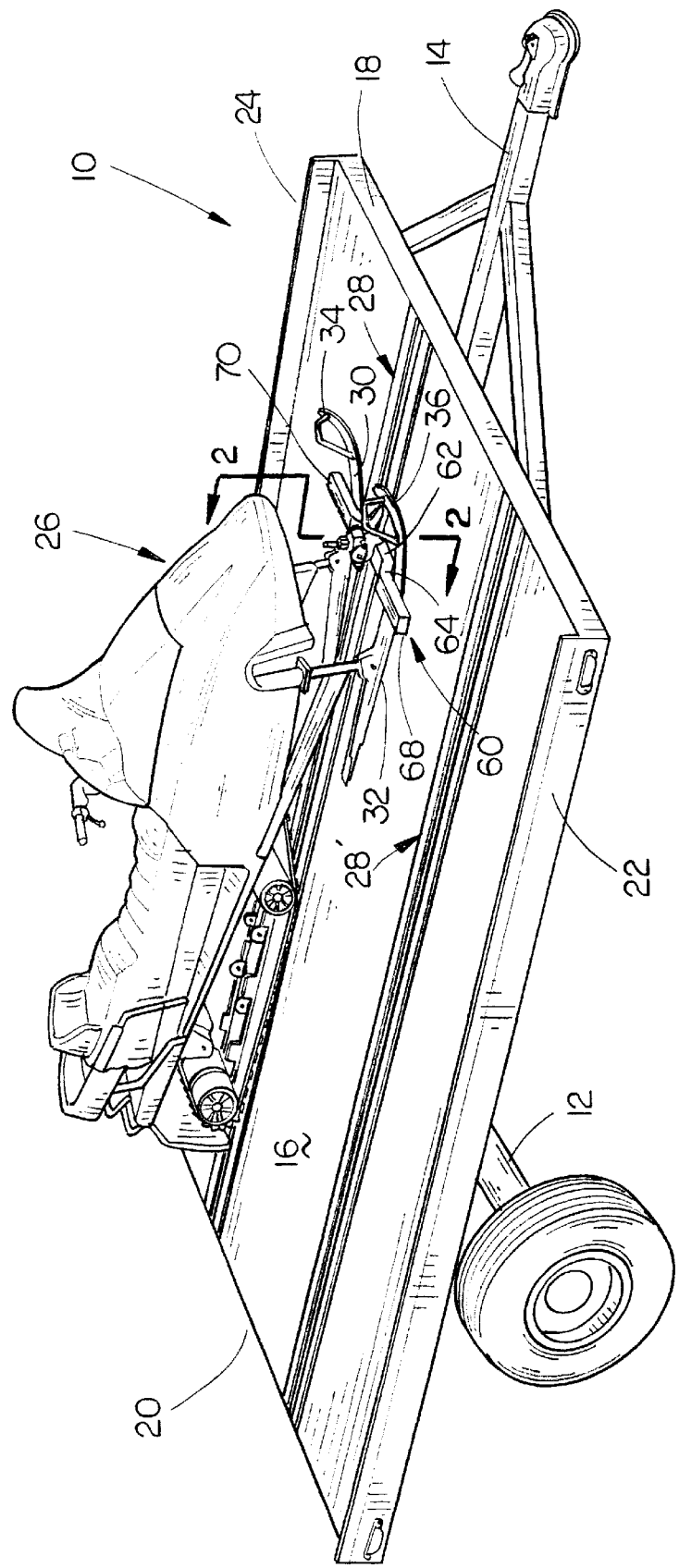
FIG. 1 is perspective view of a trailer having a snowmobile mounted thereon and attached thereto.
Figure 2:
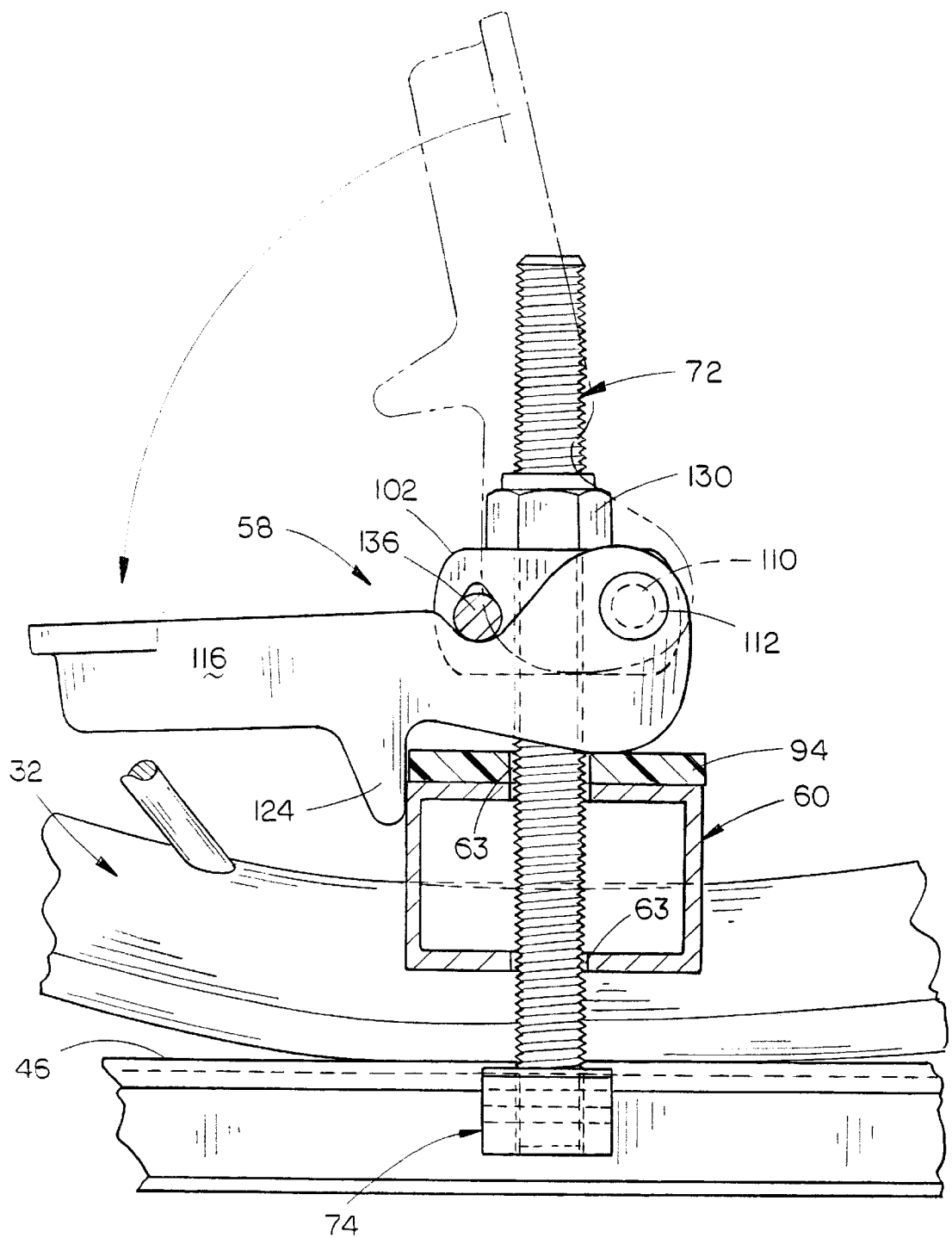
FIG. 2 is a partial vertical sectional view of the means for locking the snowmobile to the track which is embedded in the bed of the trailer.

The numeral 10 refers generally to a conventional snowmobile trailer having a wheeled frame 12, forwardly extending hitch 14 and a trailer bed 16. For purposes of description, bed 16 will be described as having a forward end 18, rearward end 20, and opposite sides 22 and 24. If the trailer 10 is going to be used to accommodate a single snowmobile 26, a single track member 28 is provided in the bed or deck 16 of the trailer 10. If a pair of snowmobiles 26 are going to be transported on the trailer 10, a pair of track members 28 and 28' are utilized. The number of track members will depend upon the number of snowmobiles to be transported. For purposes of conciseness, only one of the track members and snowmobiles will be described in detail. Although FIG. 1 illustrates that the track members 28 and 28' extend the entire length of the trailer bed 16, they normally would only extend a fairly short distance from the front of the bed.

Snowmobile 28 includes a pair of skis 30 and 32 at the forward end thereof which have tip portions 34 and 36 at the forward ends thereof, respectively, in conventional fashion. Track member 28 includes a bottom plate 38, horizontally spaced-apart and vertically disposed walls 40 and 42, and top plates 44 and 46 which are spaced-apart to define an opening 48 therebetween. Preferably, the inner ends of top plates 44 and 46 are provided with downwardly extending lips 50 and 52, respectively. Although the configuration of the track member 28 is preferably that illustrated in the drawings, many different types of track members could be utilized as long as the longitudinally extending opening 48 is provided. It is also preferred that track member 28 have the lips 50 and 52 for a purpose to be described hereinafter. As seen in the drawings, track member 28 defines channel portions 54 and 56 which receive the bed 16.

Figure 3:
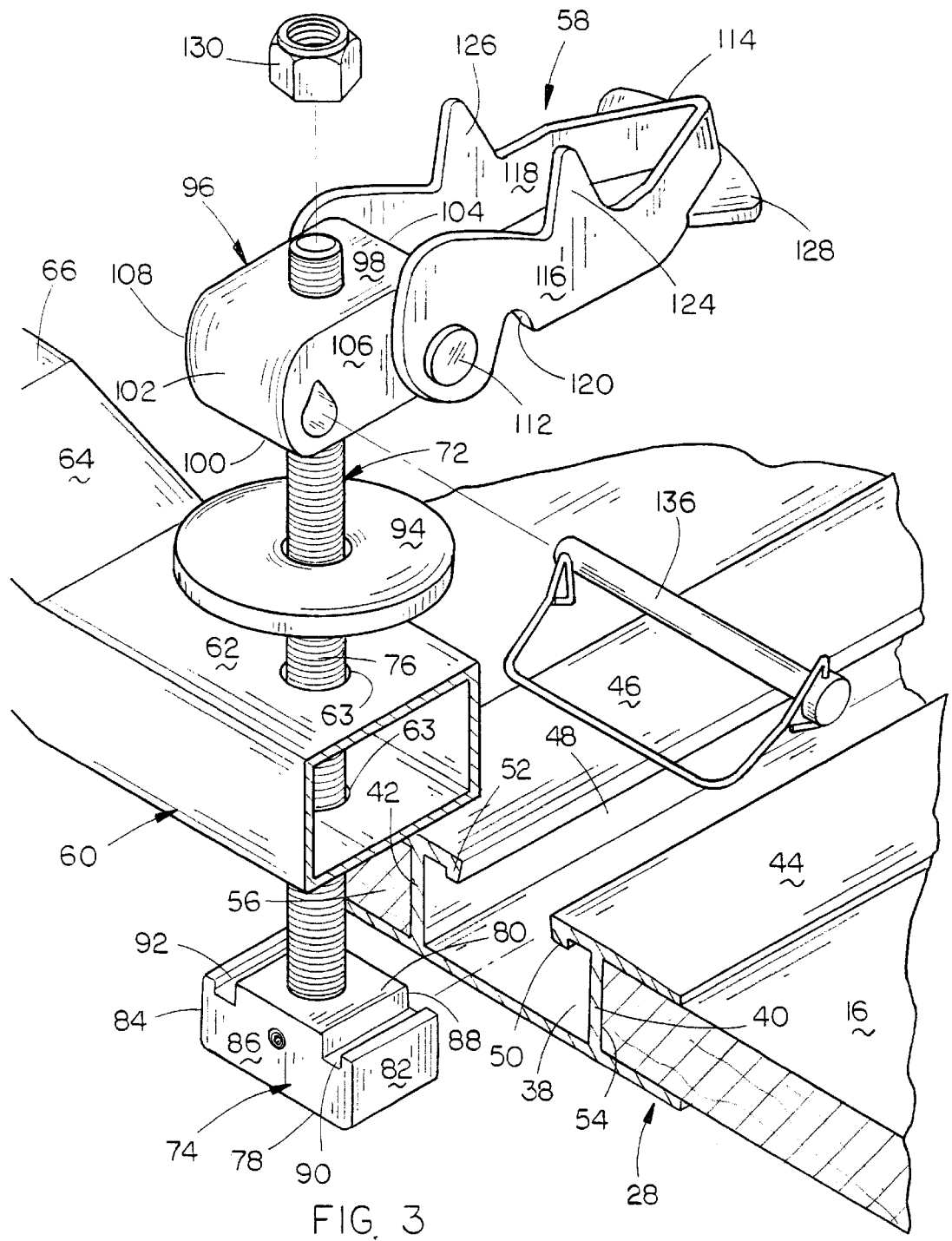
FIG. 3 is an exploded perspective view of the structure of FIG. 2.
Figure 5:
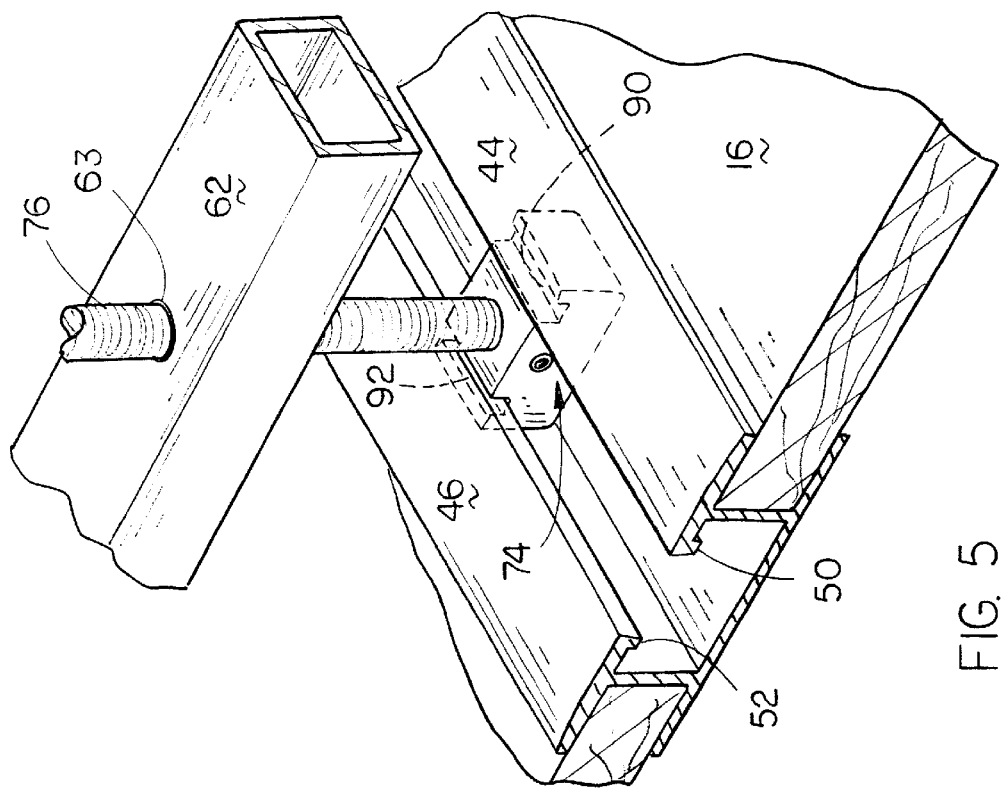
FIG. 5 is a view similar to FIG. 4 except that the bolt head of the bolt has been rotated 90° with respect to FIG. 4.
Figure 4:
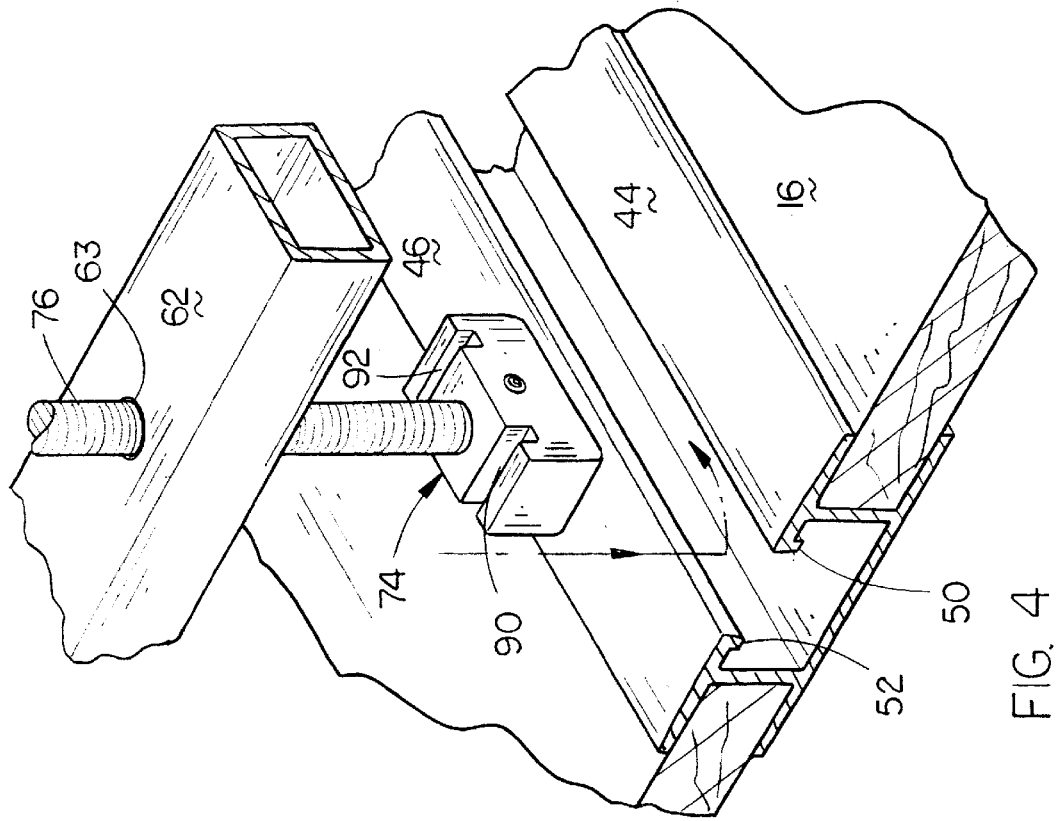
FIG. 4 is a partial perspective view illustrating the locking mechanism being lowered with respect to the track member.

The numeral 58 refers to the quick latch mechanism of this invention which is used in association with a ski bar or crossbeam 60, as will now be described. Ski bar 60 has a tubular cross-section and includes a central portion 62, angular portions 64 and 66, and end portions 68 and 70 extending horizontally outwardly from the upper ends of angular portions 64 and 66, respectively. The ski bar 60 will normally be used in an orientation wherein the end portions 68 and 70 are disposed above central portion 62, but the ski bar 60 may be rotated one hundred eighty degrees so that the end portions 68 and 70 are disposed below central portion 62 to enable the ski bar 60 to be used with snowmobile skis having various heights or thicknesses. Further, the ski bar 60 could be a straight member if desired. Quick latch mechanism 58 includes a bolt 72 having a head 74 and a threaded shank 76. Head 74 is generally rectangular in shape and has a lower end 78, upper end 80, opposite ends 82 and 84, and opposite sides 86 and 88. Head 74 is pinned to the lower end of threaded shank 76, as illustrated in the drawings. The upper end 80 of head 74 is provided with a pair of slots or channels 90 and 92 formed therein which are adapted to receive the lips 50 and 52 of track member 28, respectively. Shank 76 extends upwardly through ski bar 60, as seen in FIG. 3. The engagement of the lips 50 and 52 with the slots 90 and 92 prevents rotation of the head 74 with respect to the track member 28. if the track member 28 does not utilize the lips 50 and 52, the reception of the upper end 80 of head 74 in the opening 48 will prevent rotation of the head 74 with respect to the track member 28.

A thermoplastic washer 94 is movably mounted on threaded shank 76 above ski bar 60 (FIG. 3). The numeral 96 refers to a nut or nut block which is selectively threadably mounted on threaded shank 76. For purposes of description, nut 96 will be described as having an upper end 98, lower end 100, opposite ends 102 and 104, and opposite sides 106 and 108. Opening 110 is formed in nut 96 and extends between the sides thereof adjacent end 104. Pivot pin 112 is mounted in nut 96 adjacent end 104 and extends between the sides 106 and 108, as seen in the drawings.

The numeral 114 refers to a lever or handle having a pair of legs 116 and 118 positioned on opposite sides of nut 96 and which are secured to pivot pin 112. The upper ends of legs 116 and 118 are each provided with a notch 120 formed therein. The lower ends of legs 116 and 118 are provided with protrusions 124 and 126, respectively, which extend downwardly therefrom. The closed end of the lever 114 has a plate 128 provided thereon for a purpose to be described hereinafter. Adjustment nut 130 is selectively threadably mounted on the upper end of threaded shank 76 above nut 96.

In use, the snowmobile 26 is driven onto the trailer bed 16 of the trailer 10 so that the skis 30 and 32 straddle track member 28. Quick latch mechanism 58 will have been previously secured to the ski bar 60 by first threadably removing adjustment nut 130 and nut 96 from threaded shank 76, extending threaded shank 76 of bolt 72 upwardly through opening 63 of central portion 62 of ski bar 60, threadably mounting nut 96 on threaded shank 76 above ski bar 60, and threadably mounting adjustment nut 30 on threaded shank 76.

Bolt 72 is rotated so that the longitudinal axis of head 74 is aligned with opening 48 of track member 28. Head 74 is then moved downwardly through opening 48 until the upper end 80 of head 74 is positioned below top plates 44 and 46. Head 74 is then rotated ninety degrees, or one quarter turn, so that the channels 90 and 92 of head 74 are aligned with lips 50 and 52, respectively. The ski bar 60 is positioned at right angles to the track member 28 so that the end portions 68 and 70 of ski bar 60 are positioned over the skis 30 and 32, respectively. At this time, the lever 114 will be in its vertically disposed release position. Lever 114 is threadably rotated with respect to bolt 72 to vertically adjust lever 114 into the proper position on threaded shank 76. When the lever 114 has been properly adjusted with respect to threaded shank 76, the adjustment nut 30 is threadably moved downwardly on threaded shank 76 until it engages the upper end of the nut 96 which prevents the quick latch from coming out of adjustment for the particular pair of skis for which it has been adjusted. Lever 114 is then pivotally moved downwardly from its release position to its locking position so that it extends at a right angle with respect to ski bar 60 and extends forwardly therefrom. As lever 114 is pivotally moved downwardly, the cam surfaces provided on the lower inner ends of legs 116 and 118, respectively, pivotally engage the washer 94, which is positioned on tile upper surface of ski bar 60, which causes the head 74 of bolt 72 to be drawn upwardly with respect to ski bar 60 so that the channels 90 and 92 of head 74 are drawn into engagement with the lips 50 and 52, respectively. The washer 94 reduces the amount of friction which would be present between the cam surfaces and the upper surface of the ski bar 60. The pivotal movement of the lever 114 to its locked position also forces the ski bar 60 downwardly into frictional engagement with the skis 30 and 32, respectively. When the lever 114 is in its locked position, the protrusions 124 and 126 are positioned forwardly of the ski bar 60 to prevent inadvertent rotation of the lever 114 with respect to the ski bar 60. Locking pin 136 is extended through the notches 120–122 and opening 110 of nut 96 to prevent the lever 114 from pivotally moving from its locked position to its release position. The locking pin 136 may be replaced with a padlock as a theft deterrent.

When it is desired to remove the snowmobile from the trailer, locking pin 136 is removed from the mechanism 58 and the lever 114 is pivotally moved upwardly from its locked position to its release position. Head 74 of bolt 72 is then rotated one quarter turn so that the longitudinal axis thereof is aligned with the opening 48 to enable the mechanism to be pulled upwardly out of engagement with the track member 28 which permits the ski bar 60 to be moved out of engagement with the skis on the snowmobile.

It can therefore be seen that a novel quick latch tie-down mechanism has been provided for securing a snowmobile to a trailer. The system is designed so that the snowmobile can be adjusted forward or backwards on a trailer, therefore providing for proper weight placement on the trailer. The quick latch system of this invention, used in conjunction with the track, provides for infinite weight adjustment of the load to be hauled. With the conventional prior art systems, the snowmobile had to be sometimes tugged forwardly or pushed rearwardly in order to line-up the crank with the receiving nut mounted in the deck of the trailer.

Thus it can be seen that the mechanism of this invention accomplishes at least all of its stated objectives.

I claim:

1. A trailer and tie-down mechanism for securing and transporting a snowmobile, having right and left skis at the forward end thereof, comprising:

said trailer having a bed portion comprising a forward end, a rearward end, and opposite sides;

an elongated track member secured to the bed portion of said trailer between the sides thereof and extending parallel to the sides of the bed portion to enable the skis of the snowmobile to be positioned on opposite sides thereof;

an elongated ski bar, having opposite ends, positioned above said track member and extending transversely with respect to said track member so that the ends of said ski bar are positioned on opposite sides of said track member above the skis of the snowmobile;

an elongated bolt having a head portion selectively removably longitudinally received by said track member and a threaded shank extending upwardly therefrom;

a threaded nut on said threaded shank of said bolt above said ski bar;

and a lever pivotally secured to said threaded nut, about a horizontal axis, and being movable between a substantially vertically disposed release position and a substantially horizontally disposed locked position;

said lever including a cam portion which engages said ski bar as said lever is moved from its said release position to its said locked position for drawing said head portion of said elongated bolt upwardly into engagement with said track member and for moving said ski bar downwardly into engagement with the skis of the snowmobile.

2. The tie-down mechanism of claim 1 further including a locking means for locking said lever in its said locked position.

3. The tie-down mechanism of claim 1 wherein said track member is embedded in the bed portion of said trailer.

4. The tie-down mechanism of claim 1 wherein said track member has an upper end, a lower end, and opposite sides and wherein said upper end has an elongated slot formed therein which communicates with the interior of said track member; said head portion of said bolt being selectively movably positioned in the interior of said track member with said threaded shank extending upwardly through said elongated slot.

5. The tie-down mechanism of claim 1 wherein said upper end of said track member is substantially flush with the bed portion of said trailer.

6. The tie-down mechanism of claim 1 wherein said ski bar comprises a horizontally disposed central portion and end portions which are positioned above said central portion.

7. The tie-down mechanism of claim 6 wherein said end portions of said ski bar are substantially horizontally disposed.

8. The tie-down mechanism of claim 1 wherein said cam portion operatively engages said ski bar, as said lever is moved from its said release position to its said locked position.

9. The tie-down mechanism of claim 8 wherein the operative engagement of said cam portion with said ski bar also moves said ski bar downwardly into engagement with said skis.

10. The tie-down mechanism of claim 9 further including means on said lever for preventing the rotation of said lever with respect to said bolt when said lever is in its said locked position.

11. The tie-down mechanism of claim 9 further including a protrusion extending from said lever which is positioned adjacent said ski bar, when said lever is in its said locked position, for preventing the rotation of said lever with respect to said bolt.

12. The tie-down mechanism of claim 8 wherein a thermoplastic washer is mounted on said bolt above said ski bar so that said cam portion engages said thermoplastic washer as said lever is pivotally moved to its said locked position.

13. The tie-down mechanism of claim 1 wherein means is provided for preventing the rotation of said head portion of said bolt with respect to said track member.

* * * * *